United States Patent
Lee et al.

(10) Patent No.: US 11,438,055 B2
(45) Date of Patent: Sep. 6, 2022

(54) METHOD AND DEVICE FOR PERFORMING BIDIRECTIONAL COMMUNICATION USING MOBILE RELAY IN WIRELESS COMMUNICATION SYSTEM

(71) Applicant: Korea University Research and Business Foundation, Seoul (KR)

(72) Inventors: Inkyu Lee, Seoul (KR); Su Bin Eom, Daejeon (KR)

(73) Assignee: Korea University Research and Business Foundation, Seoul (KR)

( * ) Notice: Subject to any disclaimer, the term of this patent is extended or adjusted under 35 U.S.C. 154(b) by 0 days.

(21) Appl. No.: 16/933,392

(22) Filed: Jul. 20, 2020

(65) Prior Publication Data

US 2021/0266060 A1 Aug. 26, 2021

(30) Foreign Application Priority Data

Feb. 14, 2020 (KR) .......................... 10-2020-0018101

(51) Int. Cl.
*H04B 7/185* (2006.01)
*H04W 72/04* (2009.01)
*H04W 24/02* (2009.01)

(52) U.S. Cl.
CPC ........ *H04B 7/18504* (2013.01); *H04W 24/02* (2013.01); *H04W 72/042* (2013.01); *H04W 72/0413* (2013.01); *H04W 72/0493* (2013.01)

(58) Field of Classification Search
CPC .................. H04B 7/15528; H04B 7/18504; H04W 24/02
See application file for complete search history.

(56) References Cited

U.S. PATENT DOCUMENTS

2009/0104911 A1* 4/2009 Watanabe ............. H04W 36/30
455/436
2017/0078981 A1* 3/2017 Tian .................... H04W 52/241

FOREIGN PATENT DOCUMENTS

CN 108667504 A 10/2018
CN 110138443 A 8/2019
(Continued)

OTHER PUBLICATIONS

Alsharoa, Ahmad et al., "Energy Efficient D2D Communications Using Multiple UAV Relays," arXiv preprint arXiv:1912.03714, Dec. 8, 2019 (pp. 1-6).
(Continued)

*Primary Examiner* — Ayaz R Sheikh
*Assistant Examiner* — Debebe A Asefa
(74) *Attorney, Agent, or Firm* — NSIP Law

(57) ABSTRACT

Provided is a method where mobile relay performs bidirectional inter-terminal communication in wireless communication system. The method includes determining optimal values of predetermined variables for maximizing a transmission ratio for the bidirectional inter-terminal communication during a predetermined time segment using pieces of basic information of at least one of the mobile relay, a first terminal, or a second terminal, transmitting setting information on the optimal values to at least one of the first terminal and the second terminal, and performing the bidirectional inter-terminal communication on the basis of the optimal values. The predetermined variables include at least one of a position of the mobile relay, a speed of the mobile relay, acceleration of the mobile relay, a downlink transmission power of the mobile relay, an uplink transmission power of the first terminal, an uplink transmission power of the second terminal, or a transmission resource allocation ratio for uplink and downlink.

11 Claims, 9 Drawing Sheets

(56) References Cited

FOREIGN PATENT DOCUMENTS

CN    110380773 A    10/2019
CN    110417458 A    11/2019

OTHER PUBLICATIONS

3GPP TR22.829 v17.1.0, *3rd Generation Partnership Project; Technical Specification Group Services and System Aspects; Enhancement for Unmanned Aerial Vehicles; Stage 1, Release 17*, Sep. 2019, http://www.3gpp.org, (47 pages in English).
Notice of Allowance dated Oct. 25, 2021, in counterpart Korean Patent Application No. 10-2020-0018101 (11 pages in Korean).

* cited by examiner

METHOD AND DEVICE FOR PERFORMING BIDIRECTIONAL COMMUNICATION USING MOBILE RELAY IN WIRELESS COMMUNICATION SYSTEM

CROSS REFERENCE TO RELATED APPLICATION

The present application claims priority to Korean Patent Application No. 10-2020-0018101, filed on Feb. 14, 2020, the entire contents of which is incorporated herein for all purposes by this reference.

BACKGROUND OF THE INVENTION

Field of the Invention

The present disclosure relates to bidirectional communication in a wireless communication system and, more particularly, to a method and a device for performing bidirectional communication using a mobile relay.

Description of the Related Art

Relay technologies have been proposed to expand network coverage in a wireless communication system or to prevent shadowing loss and improve a transmission ratio at a cell boundary. Relays in the related art are installed at a fixed location on the ground. For this reason, communication services are limited only in a specific area, and installation and operating costs are incurred. Recently, research has been conducted on the use of a mobile relay in a wireless communication system to deal with these problems. When compared with a relay in the related art, the use of the mobile relay decreases the installation and operating cost and makes it possible to flexibly adjust a communication service area and to selectively provide a more advantageous channel environment. For example, the mobile relay is realized in the form of an unmanned aerial vehicle (UAV).

The relay in the related art supports only unidirectional communication for transferring information to and from terminals. In contrast, a relay has to support bidirectional communication in order to exchange information between terminals. The support of the bidirectional communication using the mobile delay requires optimization of a position and a traveling path of the mobile relay, transmission powers of the mobile relay and a terminal, and allocation of resources for communication between the mobile relay and the terminal. However, detailed implementation plans or proposals for this have not yet been developed.

SUMMARY OF THE INVENTION

An objective of the present disclosure is to provide a method and a device for performing bidirectional communication between terminals using a mobile relay.

Another objective of the present disclosure is to provide a method and a device for optimizing bidirectional communication between terminals using a mobile relay.

Still another objective of the present invention is to provide a method and a device for maximizing a transmission ratio for bidirectional communication between terminals using a mobile relay.

Technical problems that the present disclosure attempted to solve are not limited to the technical problems described above. From the legend "DETAILED DESCRIPTION OF THE INVENTION", it would be apparent to a person of ordinary skill in the art that there are other technical problems that are not mentioned.

According to an aspect of the present invention, there is provided a method in which a mobile relay performs bidirectional inter-terminal communication between terminals in a wireless communication system, the method including: determining optimal values of predetermined variables for maximizing a transmission ratio for the bidirectional inter-terminal communication during a predetermined time segment using pieces of basic information of at least one of the mobile relay, a first terminal, or a second terminal; transmitting setting information on the optimal values to at least one of the first terminal and the second terminal; and performing the bidirectional inter-terminal communication on the basis of the optimal values. In the method, the predetermined variables include at least one of the following: a position of the mobile relay; a speed of the mobile relay; acceleration of the mobile relay; a downlink transmission power of the mobile relay; an uplink transmission power of the first terminal; an uplink transmission power of the second terminal; or a transmission resource allocation ratio for uplink and downlink.

According to another aspect of the present disclosure, there is provided a mobile relay device that performs bidirectional communication between terminals in a wireless communication system, the device including: a transceiver; a memory; and a processor. In the device, the processor performs operations of: determining optimal values of predetermined variables for maximizing a transmission ratio for the bidirectional communication during a predetermined time segment using pieces of basic information of at least one of the relay device, a first terminal; or a second terminal, which are stored in the memory; transmitting setting information on the optimal values to at least one of the first terminal and the second terminal through the transceiver; and performing setting in such a manner that the bidirectional communication is performed through the transceiver, on the basis of the optimal values. In the device, the predetermined variables include at least one of the following: a position of the mobile relay; a speed of the mobile relay; acceleration of the mobile relay; a downlink transmission power of the mobile relay; an uplink transmission power of the first terminal; an uplink transmission power of the second terminal; or a transmission resource allocation ratio for uplink and downlink.

Features of the present invention, which are summarized above, are only exemplary aspects of the present disclosure and do not impose any limitation on the scope of the present disclosure.

According to the present disclosure, there are provided a method and a device for performing bidirectional communication among terminals using a mobile relay.

According to the present disclosure, there are provided a method and a device for optimizing bidirectional communication between terminals using a mobile relay.

According to the present disclosure, there are provided a method and a device for maximizing bidirectional communication between terminals using a mobile relay.

According to the present disclosure, there is provided a wireless backhaul that is capable of supporting a terminal at a cell boundary in cooperation with an existing base station on the ground or of exchanging information between terminals in a situation where a connection between base stations is released, such as in case of disaster or a wartime situation.

Advantages that are to be achieved according to the present disclosure are not limited to those described above.

From the legend "DETAILED DESCRIPTION OF THE INVENTION", it would be apparent to a person of ordinary skill in the art that there are advantages that are not mentioned.

DETAILED DESCRIPTION OF THE INVENTION

Figure 1:
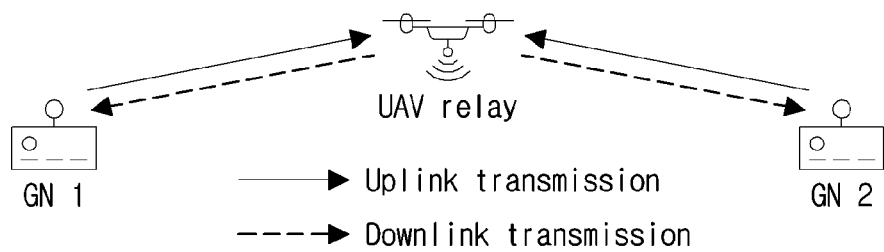
FIG. 1 a diagram illustrating a structure of a wireless communication system including a mobile relay, in which the present disclosure finds application.

Embodiments of the present disclosure will be described in detail below with reference to the accompanying drawings in such a manner that a person of ordinary skill in the art to which the present disclosure pertains is able to practice them without undue experimentation. However, the present disclosure can be implemented by modification, substitution, alteration, improvement, and the like and is not limited to the embodiments that will be described below.

When describing the embodiments of the present disclosure, in a case where detailed descriptions of configurations or functions known in the related art are determined to make the nature and gist of the present disclosure indefinite, the detailed descriptions thereof are omitted. Elements that do not relate to the description of the present disclosure are omitted from the drawings, and like elements are given like reference characters.

In the present disclosure, when a constituent element is referred to as being "connected to", being "combined with", and having "access to" one other constituent element, this means that the constituent element may be directly connected to one other constituent element or may be "indirectly connected to one other constituent with an intervening constituent element in between.

When the expression "include a constituent element" or "have a constituent element" is used, unless otherwise described, this expression means "further include at least one other constituent elements, not "exclude any other constituent element".

In the present disclosure, the terms "first", "second", and so on are used to distinguish one constituent element from another constituent element, and unless otherwise described, no limitation is imposed on the order of constituent elements or the importance of each constituent element. Therefore, a first constituent element according to an embodiment within the scope of the present disclosure may be referred to as a second constituent element according to another embodiment. Similarly, a second constituent element according to an embodiment may be referred to as a first constituent element according to another embodiment.

In the present disclosure, terms "first", "second", etc. are provided only for discriminating components from other components and, the essence, sequence, or order of the components are not limited by the terms. That is, multiple constituent elements may be integrated into one piece of hardware or one piece of software, and one constituent element may be separated into multiple pieces of hardware or multiple pieces of software. Therefore, although not specifically mentioned, an embodiment resulting from the integration or an embodiment resulting from the separation falls within the scope of the present disclosure.

In the present disclosure, constituent elements according to various embodiments are not necessarily intended to be essential constituent elements, and one or several thereof may be selected. Therefore, another embodiment including constituent elements, selected from among constituent elements that are described below and which constitute an embodiment, also falls within the scope of the present disclosure. In addition, an embodiment, which results from adding at least one constituent elements to constituent elements that constitute various embodiments described below, also falls within the scope of the present disclosure.

The present disclosure relates to communication between network nodes in a wireless communication system. Network nodes include at least one of the following: a base station, a terminal, or a relay. The term base station (BS) is used interchangeably with the terms fixed station, Node B, eNodeB (eNB), ng-eNB, gNodeB (gNB), access point (AP), and so on. The term terminal is used interchangeably with the terms user equipment (UE), mobile station (MS), mobile subscriber station (MSS), subscriber station (SS), non-AP station (non-AP STA), and so on.

The wireless communication system may support communication between a base station and a terminal or may support inter-terminal communication. Downlink (DL) in the communication between the base station and the terminal refers to communication from the base station to the terminal. Uplink (UL) refers to communication from the terminal to the base station. For the inter-terminal communication, various communication schemes or services are used, such as device-to-device (D2D), vehicle-to-everything (V2X), a proximity service (ProSe), and sidelink communication. Terminals for the inter-terminal communication include a sensor node, a vehicle, a disaster alarm, and so on.

In addition, examples of the present disclosure also find application in a wireless communication system including a relay or a relay node (RN). In a case where a relay finds application in the communication between the base station and the terminal, the relay serves as a base station communicating with a terminal and also serves as a terminal communicating with a base station. On the other hand, in a case where the relay finds application in the inter-terminal communication, the relay serves as a base station communicating with each of the terminals.

The present disclosure finds application in various multi-access schemes for the wireless communication system. Examples of the multi-access scheme include Code Division Multiple Access (CDMA), Time Division Multiple Access (TDMA), Frequency Division Multiple Access (FDMA), Orthogonal Frequency Division Multiple Access (OFDMA), Single Carrier-FDMA (SC-FDMA), OFDM-FDMA, OFDM-TDMA, OFDM-CDMA, Non-Orthogonal Multiple Access (NOMA), and so on. In addition, a wireless communication system in which the present disclosure finds application may support a Time Division Duplex (TDD) scheme that uses the respective distinctive time resources for uplink communication unit and downlink communication and may support a Frequency Division Duplex (FDD) scheme that uses the respective distinctive frequency resources for uplink communication and downlink communication.

In the present disclosure, the expression "transmit or receive a channel" has the meaning of "transmit or receive information or a signal over a channel". For example, the expression "transmit a control channel" has the meaning of "transmit control information or a control signal over a control channel". Similarly, the expression "transmit data channel" has the meaning of "transmit data information or a data signal over a data channel".

Embodiments of the present disclosure that is directed to bidirectional communication using a mobile relay will be described below.

FIG. 1 is a diagram illustrating a structure of a wireless communication system including a mobile relay, in which the present disclosure finds application.

The present disclosure finds application in a wireless communication system in which the mobile relay relays bidirectional inter-terminal communication. However, the scope of the present disclosure is not limited to this, and the examples of the present disclosure may find application in a wireless communication system in which at least one mobile relay perform communication among two or more terminals.

FIG. 1 illustrates a UAV relay as an example of the mobile relay and a ground node (GN) as an example of the terminal. That is, FIG. 1 illustrates the wireless communication system in which the mobile delay (UAV relay) relays bidirectional communication between a first terminal GN1 and a second terminal GN2. For example, a situation is assumed where the first and second terminals cannot perform communication without the relay in between.

In the following description, unless confusion is not created, the relay refers to the mobile relay, the terminal refers to the ground node (GN), and a mobile relay system relays to the wireless communication system in which the mobile relay relays the bidirectional inter-terminal communication.

The relay receives information from the first terminal over uplink and transmits the received information to the second terminal over downlink. In addition, the relay receives information from the second terminal over uplink and transmits the received information to the first terminal over downlink.

A bidirectional relay system for exchanging information between the first and second terminals simultaneously performs transmission and reception through the relay, thereby increasing resource efficiency. For example, the bidirectional relay system improves frequency spectrum efficiency (spectral efficiency), when compared with a unidirectional relay system in which, when the first terminal transfers information to the second terminal, the second terminal cannot transfer information to the first terminal. In the bidirectional relay system, the relay simultaneously receives pieces of information from the first and second terminals, respectively, and then transmits the respective pieces of information from the first and second terminals to the second and first terminals, respectively. At this point, it is assumed that the relay and each of the terminals support self-interference cancellation (SIC) that removes interference which occurs when the respective signals transmitted by the relay and each of the terminals are returned to them, respectively.

In the present disclosure, the following factors are considered in order that, in the mobile relay system, the bidirectional inter-terminal communication is optimized and that a transmission ratio for the bidirectional communication using the mobile relay is maximized.

(1) Position or a traveling path (track) of the relay
(2) Transmission power of the relay and a transmission power of each of the first and second terminals
(3) Resource allocation for communication between the relay and the first terminal and between the mobile relay and the second terminal A transmission ratio needs to be expressed on the basis of the factors described above in order to maximize the transmission ratio in the mobile relay system.

In this regard, the present disclosure makes the following assumption:
the relay, the first terminal, and the second terminal each include one antenna (or an antenna port);
the relay and the first and second terminals are positioned on a two-dimensional plane;
positions of the first and second terminals are fixed and the relay possibly travels during a time segment during which bidirectional relay communication is performed between the relay and each of the first and second terminals; and
the mobile relay system supports the FDD scheme.

However, the assumption is made only for definitely describing the principle behind the present disclosure and does not impose any limitation on the scope of the present disclosure. In a case where each of the devices has multiple antennas or is positioned in a three-dimensional space and where the terminal travels, the principle that is described in the examples of the present disclosure also applies to a TTD system in an expanded manner.

In the following description, an index of the terminal GN is defined as k. $W_k$ that is a position of $GN_k$ ($k \in \mathcal{K} \triangleq \{1,2\}$) is specified on a two-dimensional plane $\mathbb{R}^{2 \times 1}$ (that is, $w_k \in \mathbb{R}^{2 \times 1}$).

A predetermined time segment during which the bidirectional relay communication is performed in the mobile relay system is defined as T. T is discretized or divided into N time segments. That is, the N time segments have the same length. For example, each of the N time segments that result from the discretization has a time segment (a time length) of $$\delta_t = \frac{T}{N}.$$

Position q, speed v, and acceleration a of the relay during an n (n is a natural number that is equal to or smaller than 1, that is, satisfies $n \in \mathcal{N} \triangleq \{1, \ldots, N\}$)-th time segment are expressed as $q[n] \in \mathbb{R}^{2 \times 1}$, $v[n] \in \mathbb{R}^{2 \times 1}$, and $a[n] \in \mathbb{R}^{2 \times 1}$, respectively.

In this case, position q, speed v, and acceleration a of the relay have a relationship as expressed in Equation 1.

$$v[n+1] = v[n] + a[n]\delta_t, \quad \forall n \in \mathcal{N}$$

$$q[n+1] = a[n] + v[n]\delta_t + \frac{1}{2}a[n]\delta_t^2, \quad \forall n \in \mathcal{N}$$

$$\|v[n]\| \leq V_{max}, \|a[n]\| \leq a_{max} \quad \forall n \in \mathcal{N} \qquad \text{Equation 1}$$

where $V_{max}$ denotes a maximum speed and $a_{max}$ denotes maximum acceleration. In Equation 1, speed v[n+1] of the relay during an (n+1)-th time segment is calculated by adding up speed v[n] of the relay during the n-th time segment and a result of multiplying acceleration a[n] of the relay during the n-th time segment by interval $\delta_t$ that is one time segment. Accordingly, position q[n+1] of the relay during the (n+1)-th time segment is calculated by adding a linear distance the relay travels at constant acceleration during $\delta_t$ to the position of the relay during the n-th time segment.

In this case, channel gain h varies according to a distance between the relay and $GN_k$. That is, channel gain $h_k[n]$ between the relay and $GN_k$ during the n-th time segment is expressed as in Equation 2.

$$h_k[n] = \frac{\gamma_0}{\|q[n] - w_k\|^2 + H^2}, \forall k \in \mathcal{K}, \forall n \in \mathcal{N}. \quad \text{Equation 2}$$

where $\gamma_0$ denotes a signal-to-noise ratio (SNR) at a predetermined unit distance (for example, 1 m) and is defined as $\gamma_0 \triangleq \beta_0/(B\sigma^2)$, $\beta_0$ denotes a channel gain at the unit distance, B denotes an entire frequency bandwidth at the unit distance, and $\sigma^2$ denotes a power of Gaussian noise at the unit distance, and H denotes an altitude of the relay.

The relay operates in compliance with a decode-and-forward (DF) relay scheme on the basis of the channel gain calculated as described above. For example, the relay decodes a signal received from the first terminal and/or the second terminal over an uplink channel and stores the resulting signal in an internal buffer. Then, in a case where the channel gain that the relay measures while traveling is at or above a predetermined threshold, the relay transmits the stored information to the second terminal and/or the first terminal over a downlink channel.

Next, in the mobile relay system in compliance with the FDD scheme, the respective distinctive frequency resources (or frequency bandwidths) are allocated for uplink and downlink. In addition, the frequency resources allocated for uplink and downlink may be the same or different in magnitude (or in frequency bandwidth).

For example, in the wireless communication system, resource candidates (or resource pools) that are available for the bidirectional relay communication are set in advance. Information indicating these resource candidates may be signaled in advance to the relay or at least one of the terminals. Alternatively, information on the resource candidate may be predetermined in advance as a default value. In addition, the relay and/or the terminal allocate or determine a resource to be used for the bidirectional relay communication, autonomously, under the instruction of another network node (for example, a control node), or according to a predetermined rule.

A ratio for an uplink frequency bandwidth allocated during the n-th time segment is expressed as $\alpha_U[n]$ (here, $\alpha_U[n] \geq 0$), and a ratio for a downlink frequency bandwidth ratio allocated during the n-th time segment is expressed as $\alpha_D[n]$ (here, $\alpha_D[n] \geq 0$). In this case, the sum of the ratios for the frequency bandwidths allocated for uplink and downlink during the n-th time segment is 1 and expressed as $\alpha_U[n] + \alpha_D[n] = 1$.

In addition, an uplink transmission power from $GN_k$ to the relay during the n-th time segment is expressed as $p_{U_k}[n]$, and a downlink transmission power from the relay to $GN_k$ is expressed as $p_{D_k}[n]$. In this case, the uplink and downlink transmission powers satisfy a condition such as Equation 3.

$$\frac{1}{N}\sum_{n=1}^{N-1} p_{U_k}[n] \leq P_{U,avg}, \forall k \in \mathcal{K}, 0 \leq p_{U_k}[n] \leq P_{U,peak}, \quad \text{Equation 3}$$

$$\forall k \in \mathcal{K}, \forall n \in \mathcal{N}, \frac{1}{N}\sum_{n=2}^{N}\sum_{k \in \mathcal{K}} p_{D_k}[n] \leq P_{D,avg},$$

$$0 \leq \sum_{k \in \mathcal{K}} p_{D_k}[n] \leq P_{D,peak}, \forall n \in \mathcal{N}.$$

where $P_{U,avg}$, $P_{D,avg}$, $P_{U,peak}$, $P_{D,peak}$ indicate an average uplink transmission power, an average downlink transmission power, a maximum uplink transmission power, and a maximum downlink transmission power, respectively.

Uplink transmission ratio $R_{U_k}[n]$ for $GN_k$ during the n-th time segment is expressed as in Equation 4. That is, it can be calculated on the basis of the channel gain, the ratios for the uplink and downlink frequency bandwidths, and the uplink and downlink transmission powers, which are as described above.

$$R_{U_k}[n] = \alpha_U[n] \log_2\left(1 + \frac{p_{U_k}[n]h_k[n]}{p_{U_{\bar{k}}}[n]h_{\bar{k}}[n] + \alpha_U[n]}\right) \quad \text{Equation 4}$$

In Equation 4, by definition, if k=1, $\bar{k}$=2, and if k=2, $\bar{k}$=1.

Downlink transmission ratio $R_{D_k}[n]$ for $GN_k$ during the n-th time segment is expressed as in Equation 5. That is, it can be calculated on the basis of the channel gain, the ratios for the uplink and downlink frequency bandwidths, and the uplink and downlink transmission powers, which are as described above.

$$R_{D_k}[n] = \alpha_D[n]\log_2\left(1 + \frac{p_{D_k}[n]h_k[n]}{\alpha_D[n]}\right) \quad \text{Equation 5}$$

Additionally, when transferring information to and from terminals, the relay transfers only an amount of information received from each of the terminals. Therefore, the condition should be satisfied where an amount of information that the relay is to transfer during the n-th time segment is equal to or smaller than an amount of information that the relay receives during the immediately preceding (n−1)-th time segment. This is mathematically expressed as in Equation 6.

$$\sum_{i=2}^{n} R_{D_k}[i] \leq \sum_{i=1}^{n-1} R_{U_{\bar{k}}}[i], n = 2, \ldots, N. \quad \text{Equation 6}$$

As described above, a transmission ratio for bidirectional inter-terminal relay communication in the mobile relay system during a specific time segment is calculated on the basis of (1) the position, speed, and acceleration of the relay, (2) the downlink transmission power of the relay and the uplink transmission power of each of the terminals, and (3) the ratios for the frequency bandwidths allocated for uplink transmission and downlink transmission.

A method for maximizing the transmission ratio described above will be described below.

First, when uplink and downlink for $GN_k$ and the relay are defined as $U_k$ and $D_k$, respectively, uplink and downlink between each of two terminals and the relay are expressed as $\mathcal{M} \triangleq \{U_1, U_2, D_1, D_2\}$. Accordingly, factors that should be considered in order to maximize a transmission ratio during the n-th time segment are expressed as follows.

(1) The position, speed, and acceleration of the relay are expressed as $Q \triangleq \{[n], v[n], a[n], \forall n\}$.

(2) The transmission powers of the relay and each of the terminals are expressed as $p \triangleq \{p_m[n], m \in \mathcal{M}, \forall n\}$.

(3) The ratios for the frequency bandwidths allocated for uplink and downlink are expressed as $A \triangleq \{\alpha_U[n], \alpha_D[n], \forall n\}$.

A problem of optimizing variables in the above-described factors (1), (2), and (3) to maximize an average transmission ratio for information exchanged between terminals through the relay during time T is expressed as in Equation 7.

$$(P) \max_{P,Q...A...\overline{R}_{min}} \overline{R}_{min} \qquad \text{Equation 7}$$

s.t.

$$\frac{1}{N}\sum_{n=0}^{N} R_{D_k}[n] \geq R_{min}, k \in K,$$

$$\sum_{i=2}^{n} R_{D_i}[i] \leq \sum_{i=1}^{n-1} R_{U_k}[i], n = 2, \ldots, N,$$

$$q[n+1] = q[n] + v[n]\delta_i + \frac{1}{2}a[n]\delta_i^2,$$

$$v[n+1] = v[n] + a[n]\delta_i, \|v[n]\| \leq v_{max},$$

$$\|a[n]\| \leq \alpha_{max}, \forall n,$$

$$0 \leq \alpha_U[n], \alpha_D[n] \leq 1, \alpha_U[n] + \alpha_D[n] = 1, \forall n,$$

$$0 \leq p_{U_k}[n] \leq P_{U,peak}, \forall k \in K, \forall n,$$

$$\frac{1}{N}\sum_{n=1}^{N-1} p_{U_k}[n] \leq P_{u,avg}, \forall k \in K,$$

$$0 \leq \sum_{k \in K} p_{U_k}[n] \leq P_{U,peak}, \forall n,$$

$$\frac{1}{n}\sum_{n=2}^{N}\sum_{k \in K} p_{D_i}[n] \leq P_{D,avg}.$$

Regarding the problem of Equation 7, uplink transmission ratio $R_{U_k}[n]$ and downlink transmission ratio $R_{D_k}[n]$ are non-convex functions, and consequently, Equation 7 is a non-convex problem. Thus, the transmission ratio cannot be directly calculated for maximization. Therefore, a successive convex approximation (SCA) method is used. The SCA method refers to a method in which iterative soling is performed while approximating a non-convex problem to a convex problem.

According to SCA, when a specific value of a variable (that is, an optimization value obtained by the previous iteration) is given, a substitute function having a concave lower limit and a convex upper limit of the non-convex function is obtained on the basis of the specific value of the variable. Then, the entire problem is approximated to a convex problem. Accordingly, iteration continues until an objective function converges, on the basis of values of variables, which are obtained after solving the problem resulting from the approximation.

Approximation of the non-block function to a convex or concave function will be described below.

Figure 2:
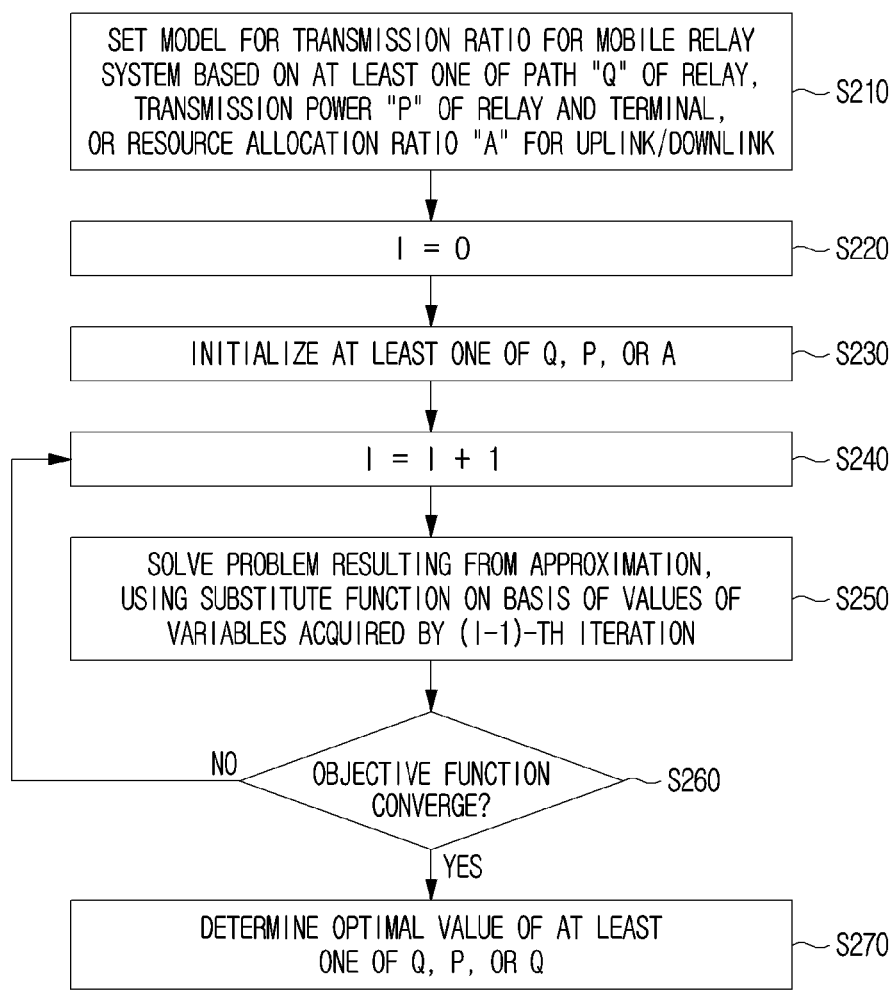
FIG. 2 is a flowchart illustrating a method of obtaining optimal values of factors for a transmission ratio to maximize a transmission ratio for a mobile relay system in which the present disclosure possibly finds application.

FIG. 2 is a flowchart illustrating a method of obtaining optimal values of factors for a transmission ratio to maximize a transmission ratio for the mobile relay system in which the present disclosure possibly finds application.

In Step S210, a model for the transmission ratio for the mobile relay system is set on the basis of at least one of variable Q for the path (that is, the position, speed, and acceleration) of the relay, transmission power P of the relay and each of the terminals, or ratio A for the frequency bandwidths allocated for uplink and downlink. For example, the model for the transmission ratio is expressed as a problem of a non-convex function, such as Equation 7.

There is a need to acquire a function that is a substitute for a non-convex function in order to approximate the model for the transmission ratio. Using the substitute function, iterative problem-solving is performed until the objective function resulting from the approximation converges. Values from the previous iteration are required to acquire a substitute function, and thus initial values of variables are set when an attempt is first made to solve a problem.

To this end, in Step S220, $^+l$ denoting the number of times of iteration is set to 0, and in Step S230, at least one of variables Q, P, or A are initialized. Then, each time an attempt is made to solve a problem, an $^+l$ value is increased by an increment of 1 as in Step S240.

Specifically, the product of transmission power p and channel gain h is defined as new variable X in order to modify the non-block functions in Equation 7. That is, the product is defined as $X_{mk}[n] \triangleq p_m[n]h_k[n]$. In this equation, if a value that is obtained by iterating variable x an l-th time is defined as $x^{(l)}$, when a $X_{mk}^{(l-1)}[n]$ value is given, a concave substitute lower-limit function for variable $X_{mk}[n]$ is expressed, through the first order Taylor approximation, as in Equation 8.

$$X_{mk}^{(l)}[n] \triangleq X_{mk}^{(l-1)}[n] + \left(1 + X_{mk}^{(l-1)}[n]\right)\left(Z_{mk}^{(l)}[n] - Y_{mk}^{(l-1)}[n]\right) \qquad \text{Equation 8}$$

$$Y_{mk}^{(l)}[n] \triangleq \log\left(1 + X_{mk}^{(l)}[n]\right)$$

$$Z_{mk}^{(l)}[n] \triangleq \log\left(\frac{\gamma_0}{h_k^{(l-1)}[n]} + S_k^{(l)}[n] + p_m^{(l)}[n]\gamma_0\right) -$$

$$\left(\log\frac{\gamma_0}{h_k^{(l-1)}[n]} + \frac{H^2 + \|q^{(l)}[n] - w_k\|^2 - \gamma_0/h_k^{(l-1)}[n]}{\gamma_0/h_k^{(l-1)}[n]}\right)$$

$$S_k^{(l)}[n] \triangleq 2(q^{(l-1)}[n] - w_k)^T(q^{(l)}[n] - q^{(l-1)}[n]).$$

Similarly, in a case where values that are obtained by (l-1)-th iteration are given, a convex substitute upper-limit function for variable $X_{mk}[n]$ is expressed, through the first order Taylor approximation, as in Equation 9.

$$X_{mk}^{(l)}[n] \triangleq \qquad \text{Equation 9}$$

$$\exp\left(\log\left(\frac{\gamma_0}{h_k^{(l-1)}[n]} + p_m^{(l-1)}[n]\gamma_0\right) + (H^2 + \|q^{(l)}[n] - w_k\|^2 - \right.$$

$$\gamma_0/h_k^{(l-1)}[n] + \gamma_0(p_m^{(l)}[n] - p_m^{(l-1)}[n]))/$$

$$\left.J_{mk}^{(l-1)}[n] - \log\left(\frac{\gamma_0}{h_k^{(l-1)}[n]} + S_k^{(l)}[n]\right)\right) - 1,$$

$$J_{mk}^{(l)}[n] \triangleq \gamma_0/h_k^{(l)}[n] + \gamma_0 p_m^{(l)}[n].$$

In addition, when a c log₂(1+z/c) function is considered in order to obtain approximation substitute functions for uplink transmission ratio $R_{U_k}[n]$ and downlink transmission ratio $R_{D_k}[n]$, in a case where $\tilde{c}$ and $\tilde{z}$ are given, a convex substitute upper-limit function for this function is expressed, through the first order Taylor approximation, as in Equation 10.

$$f(c,z \mid \tilde{c}, \tilde{z}) \triangleq \tilde{c}\log_2\left(1 + \frac{\tilde{z}}{\tilde{c}}\right) + \left(\log_2\left(1 + \frac{\tilde{z}}{\tilde{c}}\right) - \frac{\log_2 e\tilde{z}}{\tilde{c} + \tilde{z}}\right)(c - \tilde{c}) + \frac{\log_2 e\tilde{c}}{\tilde{c} + \tilde{z}}(z - \tilde{z}) \quad \text{Equation 10}$$

When values of $\alpha_U^{(l-1)}[n]$, $\alpha_D^{(l-1)}[n]$, $X_{mk}^{(l-1)}[n]$ obtained by (l-1)-th iteration are given using Equations 8 to 10 described above, concave substitute lower-limit functions for uplink transmission ratio $R_{U_k}[n]$ and downlink transmission ratio $R_{D_k}[n]$ are obtained with $\hat{R}_{U_k}^{(l)}[n]$ and $\hat{R}_{D_k}^{(l)}[n]$, respectively, in Equation 11. In addition, a convex substitute upper-limit function for downlink transmission ratio $R_{D_k}^{(l)}[n]$ is obtained with $\check{R}_{D_k}^{(l)}[n]$.

$$R_{U_k}^{(l)}[n] \geq \hat{R}_{U_k}^{(l)}[n] \triangleq \alpha_U^{(l)}[n]\log_2\left(1 + \frac{\hat{X}_{U_{\nu}k}^{(l)}[n] + \hat{X}_{U_k\bar{k}}^{(l)}[n]}{\alpha_U^{(l)}[n]}\right) - f\left(\alpha_U^{(l)}[n], \tilde{X}_{U_kk}^{(l)}[n] \mid \alpha_U^{(l-1)}[n], X_{U_kk}^{(l-1)}[n]\right) \quad \text{Equation 11}$$

$$R_{D_k}^{(l)}[n] \geq \hat{R}_{D_v}^{(l)}[n] \triangleq \alpha_D^{(l)}[n]\log_2\left(1 + \frac{\hat{X}_{D_kk}^{(l)}[n]}{\alpha_D^{(l)}[n]}\right)$$

$$R_{D_k}^{(l)}[n] \leq \alpha_D^{(l)}[n]\log_2\left(1 + \frac{\hat{X}_{D_kk}^{(l)}[n]}{\alpha_D^{(l)}[n]}\right) \leq \tilde{R}_{D_k}^{(l)}[n] \triangleq f\left(\alpha_D^{(l)}[n], \hat{X}_{D_kk}^{(l)}[n] \mid \alpha_D^{(l-1)}[n], X_{D_kk}^{(l-1)}[n]\right)$$

In Step S250, as described above, a problem resulting from the approximation can be solved.

Specifically, when convex or concave substitute functions resulting from the approximation for non-convex functions are substituted into Equation 7, if values obtained by (l-1)-th iteration are given, a problem of Equation 7 is rewritten as a problem of Equation 12.

$$(P) \max_{P,Q,A,\bar{R}_{min}} \bar{R}_{min} \quad \text{Equation 12}$$

s.t.

$$\frac{1}{N}\sum_{n=0}^{N} R_{D_k}[n] \geq R_{min}, k \in K,$$

$$\sum_{i=2}^{n} R_{D_i}[i] \leq \sum_{i=1}^{n-1} R_{U_k}[i], n = 2, \ldots, N,$$

$$q[n+1] = q[n] + v[n]\delta_i + \frac{1}{2}a[n]\delta_i^2,$$

$$v[n+1] = v[n] + a[n]\delta_i, \|v[n]\| \leq v_{max},$$

$$\|a[n]\| \leq \alpha_{max}, \forall n,$$

$$0 \leq \alpha_U[n], \alpha_D[n] \leq 1, \alpha_U[n] + \alpha_D[n] = 1, \forall n,$$

$$0 \leq p_{U_k}[n] \leq P_{U,peak}, \forall k \in K, \forall n,$$

-continued $$\frac{1}{N}\sum_{n=1}^{N-1} p_{U_k}[n] \leq P_{u,avg}, \forall k \in K,$$

$$0 \leq \sum_{k \in K} p_{U_k}[n] \leq P_{U,peak}, \forall n,$$

$$\frac{1}{n}\sum_{n=2}^{N}\sum_{k \in K} p_{D_i}[n] \leq P_{D,avg}.$$

Equation 12 is a convex problem. Thus, the respective values of variables, optimized for factors, are calculated by applying an optimization scheme (for example, CVX or the like) for a convex function.

In Step S250, a problem (that is, an objective function) resulting from the approximation as in Equation 12 is solved, and thus temporary optimal values of at least one of variables Q, P, or A are calculated. That is, optimal values of variables, which are calculated by ⁺l-th iteration, are stored as temporary optimal values. In a case where the objective function does not converge in Step S260, retuning to Step S240 takes place. Then, a ⁺1 value is increased by 1, and a problem of Equation 12, resulting from the approximation, is again solved on the basis of the temporary optimal values calculated by the previous iteration (that is, by (l-1)-th iteration) in Step S250. Thus, updating with new temporary optimal values is performed.

In a case where the objective function converges in Step S260, proceeding to Step S270 takes place. Temporary optimal values of at least one of current variables Q, P, or A are determined as optimal values.

In this manner, iterative solving is performed until the objective function in Equation 12 converges. Thus, (1) variable Q for the position, speed, acceleration of the relay, (2) variable P for the downlink transmission power of the relay and the uplink transmission power of each of the terminals, and (3) variable A for the ratios for the frequency bandwidths allocated for uplink transmission and downlink transmission are calculated.

These optimal values are determined during each of the N time segments (that is, during every n-th time segment) that results from the discretization, which belong to time segment T during which the bidirectional relay communication is performed or scheduled to be performed.

Optimal values of factors, which are obtained at convergence points as a result of iteratively solving the problem of Equation 12 are set for the relay and the terminal (s).

In addition, the optimal values of the factors are set at the same time when the relay and the terminal (s) are time-synchronized. Through the time synchronization, the relay and the terminal operate according to optimal values that are set, during every n-th time segment.

Specifically, the relay travels according to the position, speed, and acceleration that are set on a per-time-segment basis according to optimal values for the factor (1).

In addition, each of the terminals performs uplink transmission to the relay at the uplink transmission power that is set on a per-time-segment basis according to the optimal values for the factor (2).

In addition, the relay performs downlink transmission to each of the terminals at the downlink transmission power that is set on per-time-segment basis according to the optimal values for the factor (2).

In addition, the uplink frequency bandwidth is allocated to the terminal, and the downlink frequency bandwidth is allocated to the relay, at ratios, respectively, that are set on a per-time-segment basis according to the optimal values for the factor (3).

Figure 3:
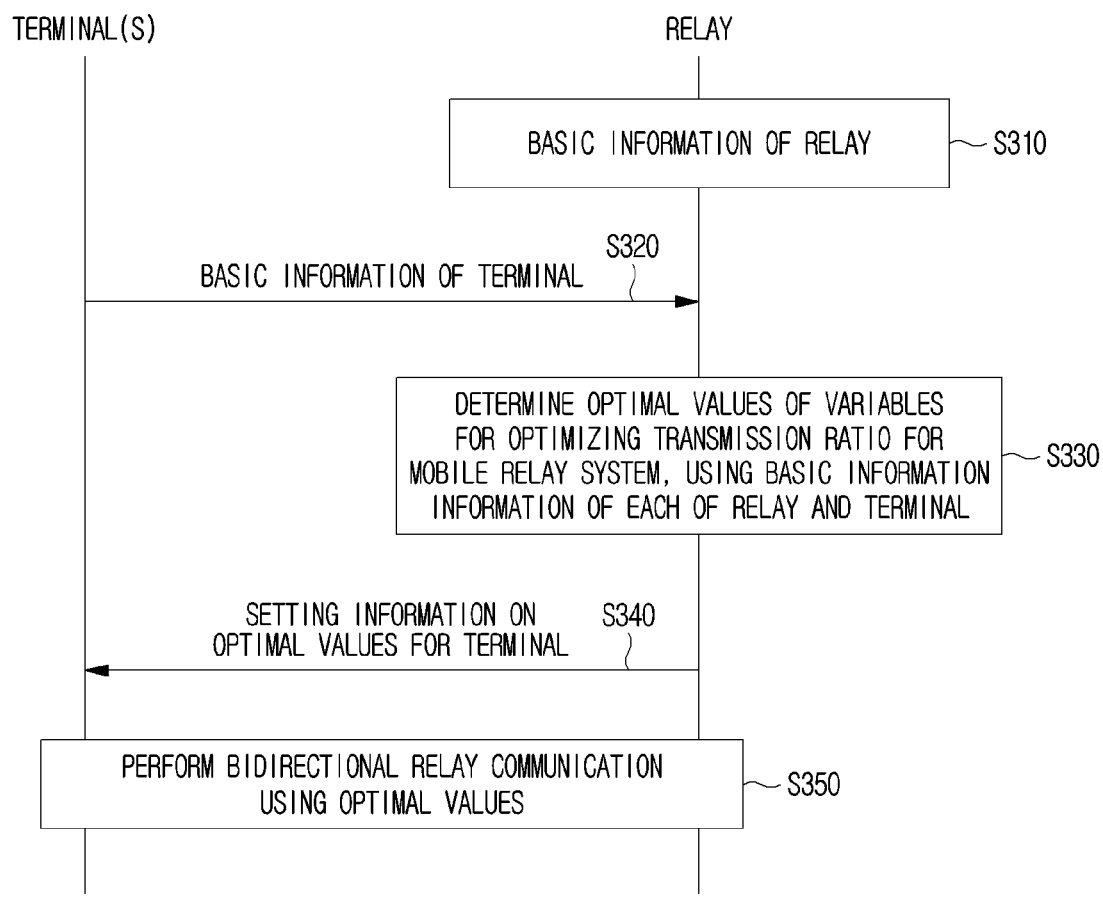
FIGS. 3 and 4 are diagrams each illustrating an example of a mobile rely communication method in which the present disclosure finds application.
Figure 4:
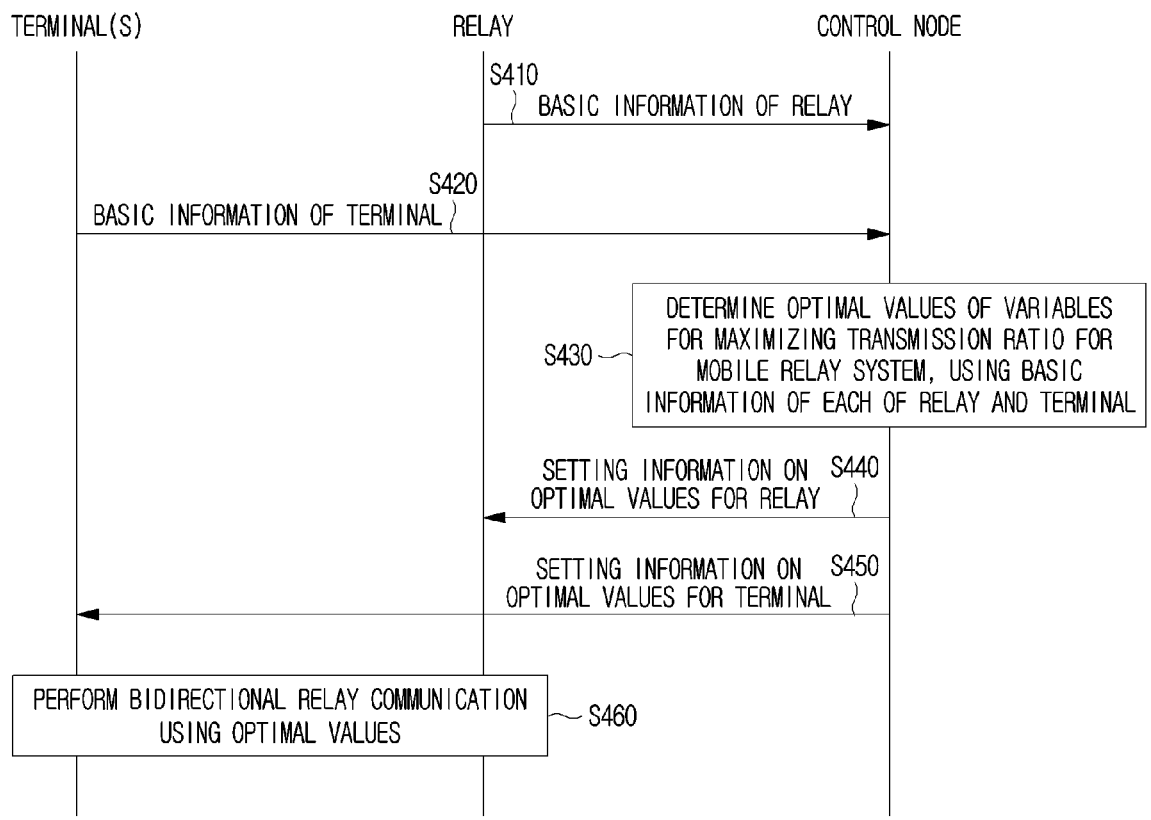

FIGS. 3 and 4 are diagrams each illustrating an example of a mobile rely communication method in which the present disclosure finds application.

In Step S310, the relay acquires or determines its own basic information. For example, the basic information of the relay includes at least one of information (for example, a departure position, a destination position, and the like) associated with the position of the relay, information (for example, a maximum speed, an average speed, acceleration, and the like) associated with the mobile capability of the relay, or information (for example, a maximum transmission power, an average transmission power, and the like) associated with the transmission capability of the relay.

In Step S320, each of the terminals transfers its own basic information to the relay. For example, the basic information of the terminal includes at least one of information (for example, a current position, information on whether or not to have mobility, and the like) associated with the position of the terminal, information (for example, a maximum transmission power, an average transmission power, and like) associated with the transmission capability of the terminal, or information (for example, the presence or absence of transmission data, an average amount of transmission information, a report on a buffer state, and the like) associated with an amount of information of the terminal.

In Step S330, the relay determines optimal values of variables for maximizing the transmission ratio for the mobile relay system using the basic information of the relay and the basic information of the terminal. That is, an operation of calculating an optical value in FIG. 2 is performed by the relay.

In Step S340, the relay transfers setting information on the optimal values to the terminal(s). For example, information on the uplink transmission power of the terminal and information on the allocation of uplink and downlink resources to the terminal are provided.

In Step S350, the relay and the terminal(s) perform the bidirectional relay communication according to optimal value setting.

As an additional example, the bidirectional relay communication may be performed as follows. The relay transfers its own basic information to the terminal, and the terminal determines an optimal value on the basis of its own basic information and the basic information of the relay, and then transfers information on setting of the determined optimal value to the relay.

As an additional example, the above-described optimal value calculation method may be performed by a network node (for example, a control node or a base station) other than the relay and the terminal. In this case, the control node may acquire in advance pieces of information on the relay and the terminal, may calculate optimal values on the basis of the pieces of information, and may provide the optimal values to the relay and the terminal, respectively.

With reference to FIG. 4, in Step S410, the control node may acquire the basic information (refer to the description of Step S310 in FIG. 3) of the relay from the relay.

In Step S420, the control node acquires the basic information (refer to the description of Step S320 in FIG. 3) of the terminal from each of the terminals. The control node may receive the basic information of the terminal directly from the terminal(s), and the relay may receive the basic information of the terminal(s), collected by the relay, from the relay.

In Step S430, the control node determines optimal values of variables for maximizing the transmission ratio for the mobile relay system using the basic information of the relay and the basic information of the terminal. That is, the operation of calculating the optimal value in FIG. 2 is performed by the control node.

In Step S440, the control node transfers the setting information on the optimal values to the relay. For example, pieces of information on a traveling path of the relay (pieces of information on the position, speed, and acceleration) and pieces of information on the downlink transmission power of the relay and the allocation of uplink and downlink resources to the relay are provided.

In Step S450, the control node transfers the setting information on the optimal values to the terminal(s). For example, information on the uplink transmission power of the terminal and information on the allocation of uplink and downlink resources to the terminal are provided. The control node may transmit the optimal values for the terminal directly to the terminal(s) and may transmit the optimal values to the terminal(s) through the relay.

In Step S460, the relay and the terminal(s) perform the bidirectional relay communication according to optimal value setting.

In the mobile relay communication method that is described with reference to FIGS. 3 and 4, the optimal value may be determined at the same time when the bidirectional relay communication between the terminal and the relay is performed. Alternatively, the optimal values are determined in advance using the basic information of each of the terminal and the relay, and the setting information on the optimal values are provided in advance to the terminal and the relay, respectively. Thereafter, the bidirectional communication relay communication may be accordingly performed.

Figure 5:
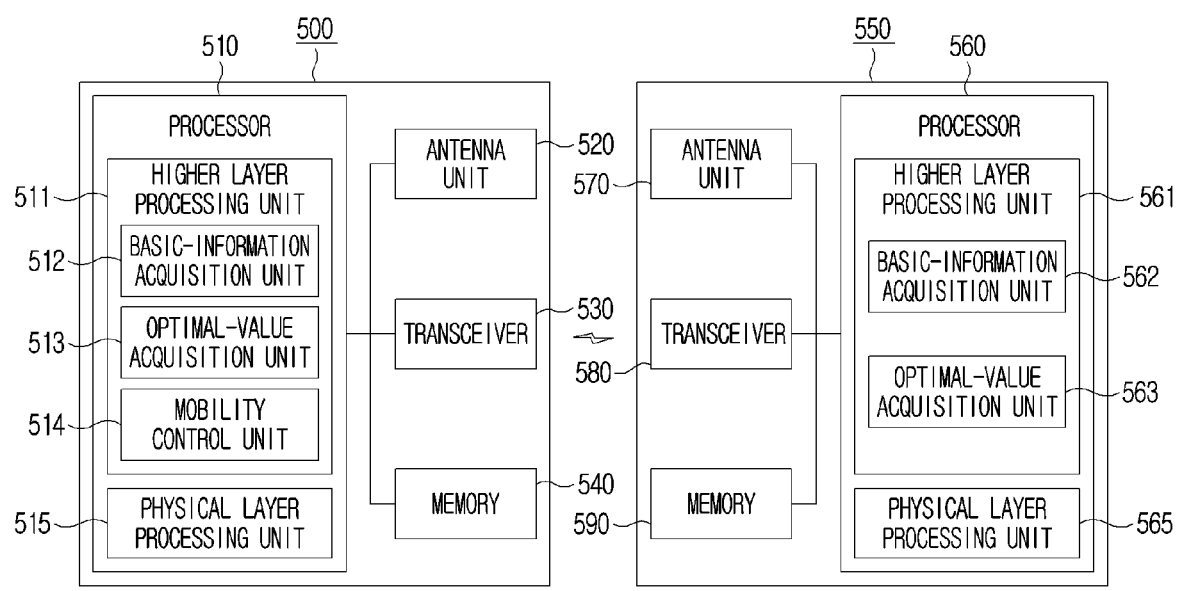
FIG. 5 is a diagram illustrating the respective configurations of a relay device and a terminal device according to the present disclosure.

FIG. 5 is a diagram illustrating the respective configurations of a relay device and a terminal device according to the present disclosure.

The relay device 500 includes a processor 510, an antenna unit 520, a transceiver 530, and a memory 540.

The processor 510 performs signal processing associated with a baseband and includes a higher layer processing unit 511 and a physical layer processing unit 515. The higher layer processing unit 511 performs processing associated with a MAC layer, an RRC layer, and a layer higher than these layers. The physical layer processing unit 515 performs processing (for example, downlink transmission signal processing, uplink reception signal processing, and the like) associated with a PHY layer. In addition to performing the signal processing associated with the baseband, the processor 510 may control overall operation of the relay device 500.

The antenna unit 520 includes one or more physical antennas and, when including multiple antennas, supports MIMO transmission and reception. The transceiver 530 includes an RF transmitter and an RF receiver. The memory 540 stores information that results from computation by the processor 510, and software, an operating system, an application, and the like, which are associated with operation of the relay device 500. The memory 540 includes a constituent element, such as a buffer.

The processor 510 of the relay device 500 causes the mobile relay according to the embodiments of the present disclosure to operate.

For example, the higher layer processing unit 511 of the processor 510 of the relay device 500 includes a basic-information acquisition unit 512, an optimal-value acquisition unit 513, and a mobility control unit 514.

The basic-information acquisition unit 512 reads the basic information (for example, pieces of information on the position, the mobile capability, the transmission capability of the relay) of the relay device 500 from the memory 540 or determines the basic information on the basis of information stored in the memory 540. In addition, the basic-information acquisition unit 512 receives the basic information (for example, pieces of information on the position, the transmission capability, and the amount of information of the terminal) of the terminal device 550 from the terminal device 550, reads the basic information that is previously received and stored in the memory 540, from the memory 540, or determines the basic information on the basis of information stored in the memory 540.

The optimal-value acquisition unit 513 determines optimal values of predetermined variables for maximizing the transmission ratio during a predetermined time segment (for example, during T that is a time segment during which the bidirectional relay communication is performed) using the basic information of each of the relay and the terminal, which is described.

For example, predetermined variables include at least one of the following: a position, speed, or acceleration of the relay device 500; a downlink transmission power of the relay device 500; an uplink transmission power of the terminal device 550; and a transmission resource allocation ratio for uplink and downlink. Among optimal values that are acquired in this manner, the information associated with the terminal device 550 is transmitted, in the format of the setting information on the optimal values, to the terminal device 550 through the physical layer processing unit 515.

In addition, the processor 510 performs the bidirectional communication in which an uplink signal received from the terminal device 550 is decoded, stored and transferred to a different terminal device over downlink, and in which an uplink signal received from the different terminal device is transferred to the terminal device 550 over downlink. While performing the bidirectional communication, the processor 510 determines and controls a downlink transmission power, and a transmission resource (for example, frequency bandwidth) allocation ratio for uplink and downlink, and the like, on the basis of the acquired optimal values.

In addition, the mobility control unit 514 determines and controls the position, speed, and acceleration of the relay device 550 on the basis of the acquired optimal values.

In a case where the optimal values are determined by a different node (for example, the base station or the control node), the basic information acquired by the basic-information acquisition unit 512 of the relay device 500 is transferred to the different network node through the physical layer processing unit 515. In this case, the optimal-value acquisition unit 513 acquires the optimal values received from the different network node.

The terminal device 550 includes a processor 560, an antenna unit 570, a transceiver 580, and a memory 590.

The processor 560 performs signal processing associated with a baseband and includes a higher layer processing unit 561 and a physical layer processing unit 565. The higher layer processing unit 561 performs processing associated with a MAC layer, an RRC layer, and a layer higher than these layers. The physical layer processing unit 565 performs operations (for example, downlink reception signal processing, uplink transmission signal processing, and the like) associated with a PHY layer. In addition to performing the signal processing associated with the baseband, the processor 560 may control overall operation of the terminal device 550.

The antenna unit 570 includes one or more physical antennas and, when including multiple antennas, supports MIMO transmission and reception. The transceiver 580 includes an RF transmitter and an RF receiver. The memory 590 stores information that results from computation by the processor 560, and software, an operating system, an application, and the like, which are associated with operation of the first terminal device 550. The memory 590 may include a constituent element such as a buffer.

The processor 560 of the terminal device 550 causes the first or second terminal according to the embodiments of the present disclosure to operate.

For example, the higher layer processing unit 561 of the processor 560 of the terminal device 550 includes a basic-information acquisition unit 562 and an optimal-value acquisition unit 513.

The basic-information acquisition unit 562 reads the basic information (for example, pieces of information on the position, the transmission capability, the amount of information of the terminal) of the terminal device 550 from the memory 590 or determines the basic information on the basis of information stored in the memory 590. The acquired basic information is transferred, in the format of the basic information of a terminal, to the relay device 500 or a different network node (for example, a base station or a control node) through the physical layer processing unit 565.

The optimal-value acquisition unit 563 determines optimal values to be applied to the terminal device 550 on the basis of the setting information on the optimal values, provided from the relay device 500 or a different network node.

Accordingly, the processor 560 of the terminal device 550 determines and controls an uplink transmission power, a transmission resource (for example, the frequency bandwidth) allocation ratio for uplink and downlink, and the like, on the basis of the acquired optimal values.

In a case where the relay device 500 and the terminal device 550 are the same in operation as the mobile relay and the first or second terminal, respectively, in the examples of the present disclosure, descriptions thereof are omitted.

Figure 6:
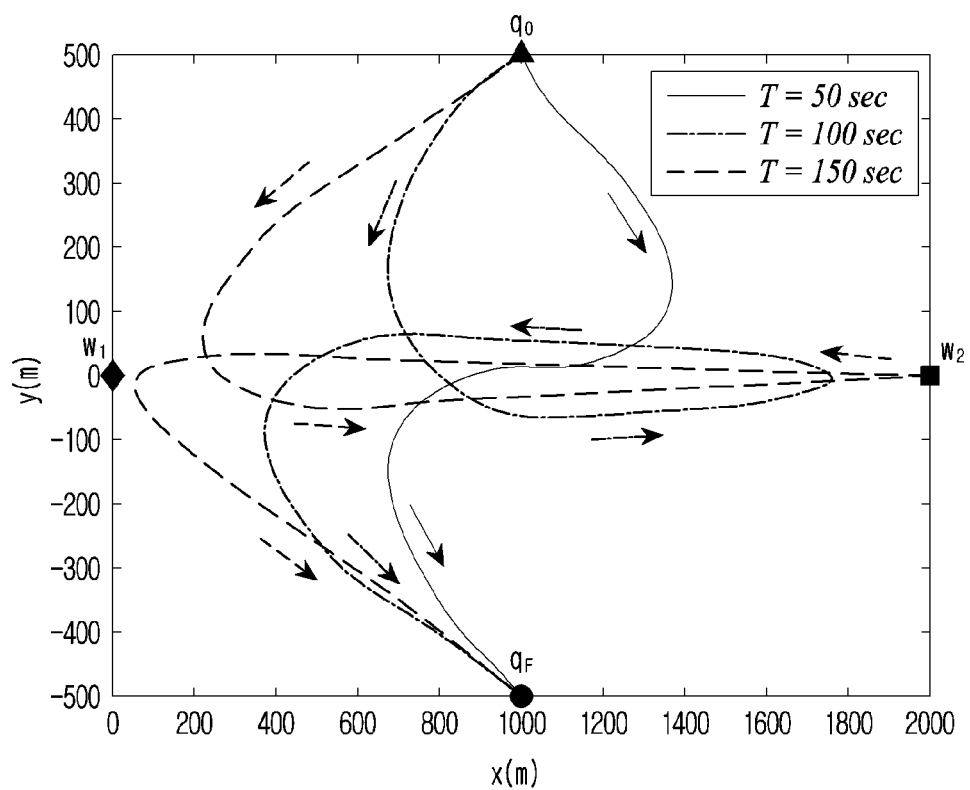
FIG. 6 is a graph illustrating the respective positions of terminals and a track of a relay according to the present disclosure.

FIG. 6 is a graph illustrating the respective positions of terminals and a track of a relay according to the present disclosure.

Figure 7:
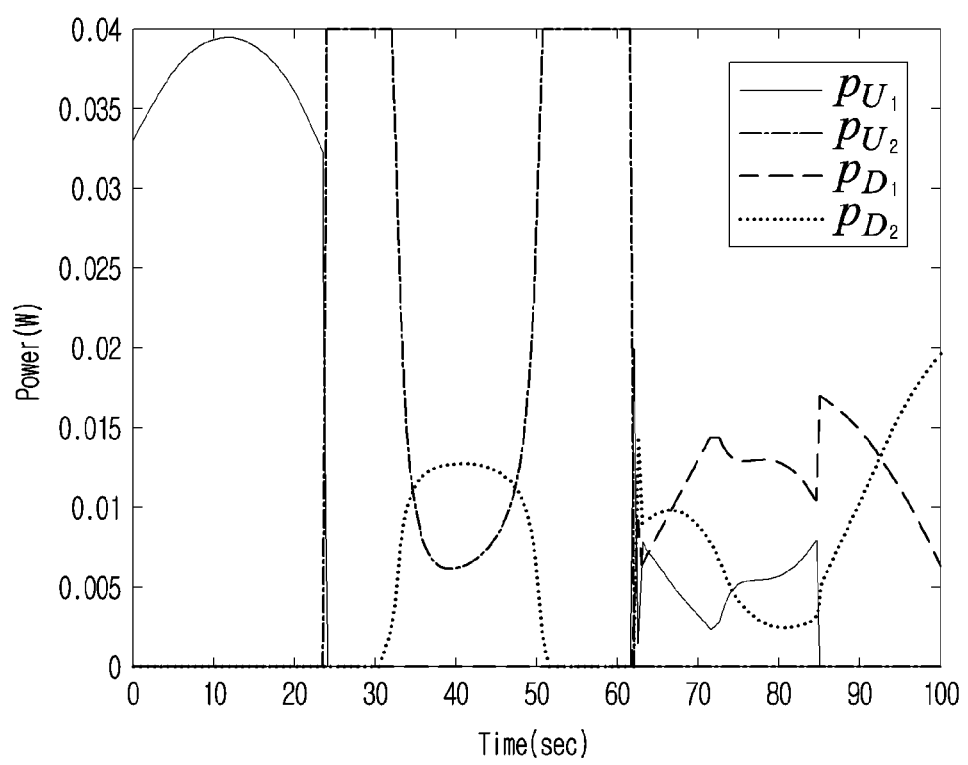
FIG. 7 is a graph illustrating an optimal value of a transmission power according to the present disclosure.

FIG. 7 is a graph illustrating an optimal value of a transmission power according to the present disclosure.

Figure 8:
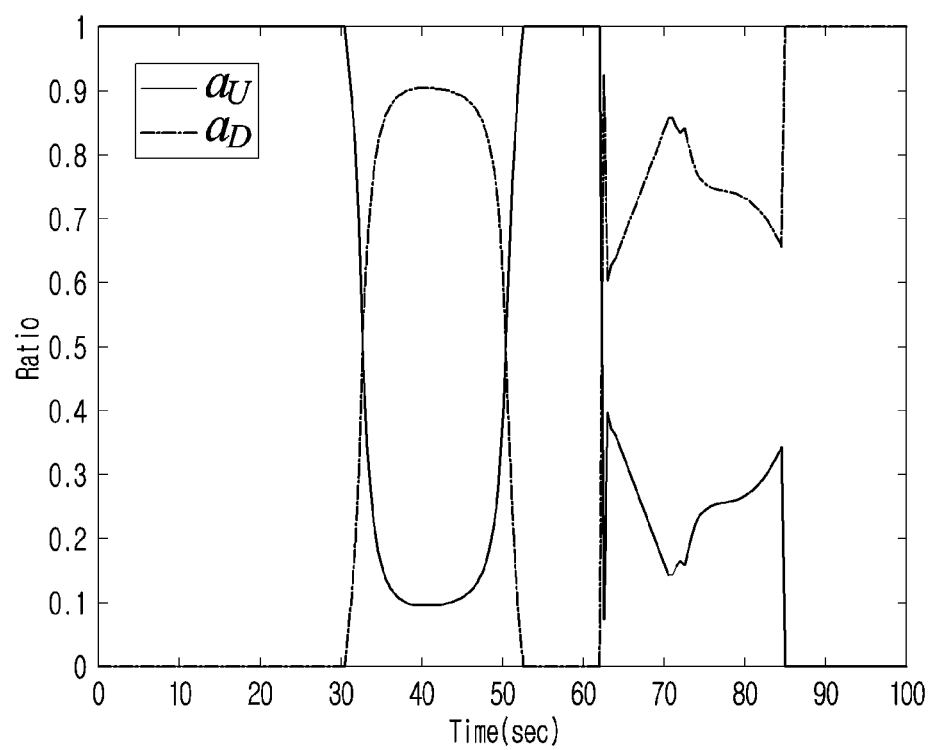
FIG. 8 is a graph illustrating an optimal value of a resource allocation ratio according to the present disclosure.

FIG. 8 is a graph illustrating an optimal value of a resource allocation ratio according to the present disclosure.

In examples in FIGS. 6 to 8, it is assumed that the respective positions of the first terminal $GN_1$ and the second terminal $GN_2$ are $w_1=[0\ 0]^T$ and $w_2=[2000\ 0]^T$, respectively. In addition, it is assumed that departure and arrival positions of the relay are $q_0=[1000\ 500]^T$ and $q_F=[1000\ -500]^T$, respectively. It is assumed that an average transmission power and a maximum transmission power for uplink and downlink are $P_{U,avg}=P_{D,avg}=0.01$ W and $P_{U,peak}=P_{D,peak}=0.04$ W, respectively. In addition, it is assumed that a reference SNR and an altitude at which the relay operates are $\gamma_0=80$ dB and $H=100$ m, respectively. In addition, it is assumed that a maximum speed and acceleration of the relay are $V_{max}=50$ m/sec and $\alpha_{max}=5$ m/sec$^2$.

FIG. 6 illustrates a traveling path of the relay in a case where T, a time segment, during which the bidirectional relay communication is performed, is 50 seconds, 100 seconds, and 150 seconds, respectively. FIGS. 7 and 8 illustrate an optimized transmission power and a frequency bandwidth allocation ratio in a case where T is 100 seconds.

From this simulation result, it can be seen that the relay tries to travel to a position near each of the terminal to get a higher channel gain and that transmission powers of the relay and the terminal and resource allocation ratios for the relay and the terminal are optimized according to the traveling of the relay.

Figure 9:
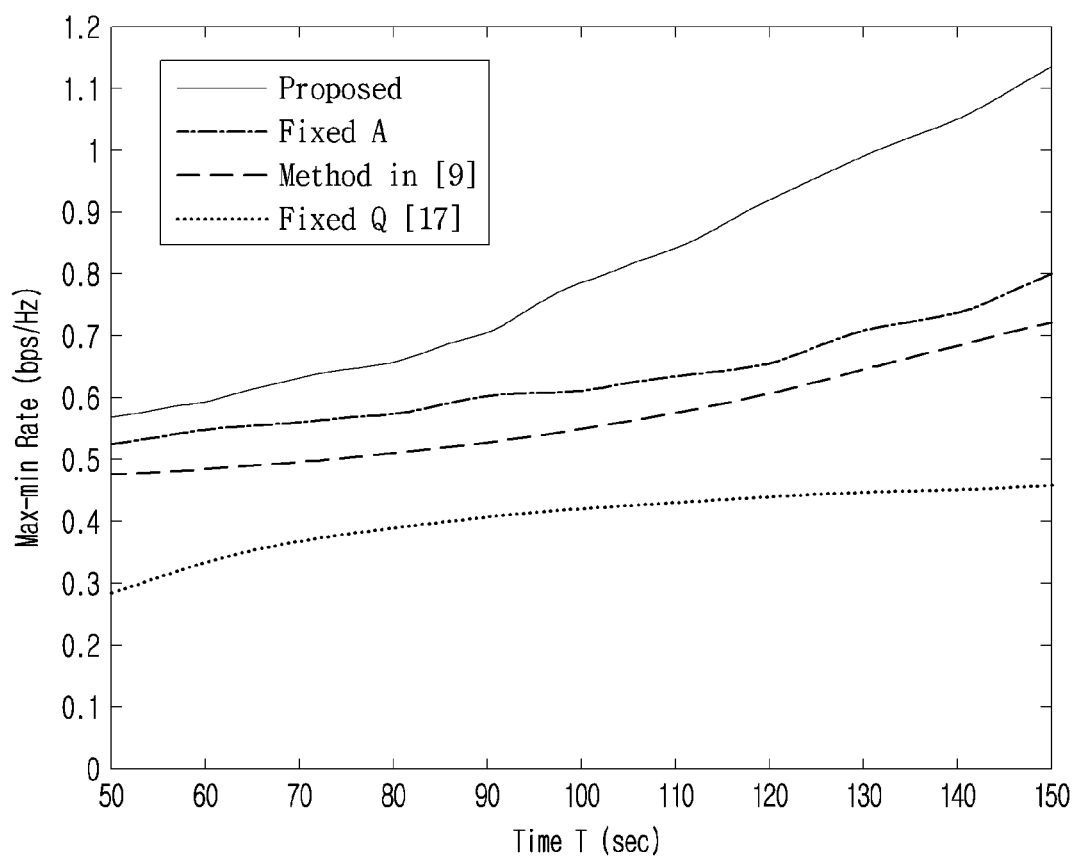
FIG. 9 is a graph illustrating a result of comparing the mobile relay system according to the present disclosure and other wireless communication systems in terms of performance.

FIG. 9 is a graph illustrating a result of comparing the mobile relay system according to the present disclosure and other wireless communication systems in terms of performance.

A solid-line (Legend: "Proposed") graph represents a result that is obtained by applying the optimization method according to the present disclosure. From the solid-line graph, it can be seen that an average transmission ratio is maximized over time. A dot-and-dash-line (Legend: "Fixed A") graph represents a case where resources allocated for uplink and downlink are fixedly the same. A broken-line (Legend: "Method in [9]" graph represents a case where a unidirectional relay is applied. A dotted-line (Legend: "Fixed Q[17]" graph represents a case where a position of the relay is fixed in the middle between two terminals, that is, at a position expressed by $$\hat{q} \triangleq \frac{w_1 + w_2}{2}.$$

From this simulation result, it can be seen that an average transmission ratio for a bidirectional relay communication scheme according to the present disclosure is always higher than those for other schemes.

Exemplary methods according to the present disclosure are described as a sequence of operations for clear description, but this is not intended to impose any limitation on the order in which steps are performed. If necessary, the steps may be performed simultaneously or in a different order. In order to implement the method according to the present disclosure, one or several other steps may be included in addition to the steps described above. Alternatively, one or several of the steps described above may be omitted. Alternatively, one or several of the steps described above may be omitted, and one or several other steps may be included.

The various embodiments of the present disclosure, which are described above, do not include all possible combinations of the constituent elements and are provided only for descriptions of representative aspects of the present disclosure. The constituent elements described according to the various embodiments may be applied independently or in combination.

In addition, the various embodiments of the present disclosure can be implemented in hardware, in firmware, in software, or with a combination of these. The various embodiment can be implemented by at least one of the following: Application Specific Integrated Circuits (ASICs), Digital Signal Processors (DSPs), Digital Signal Processing Devices (DSPDs), Programmable Logic Devices (PLDs), Field Programmable Gate Arrays (FPGAs), general processor, a controller, a micro controller, a microprocessor, and the like.

The scope of the present disclosure includes software or machine-executable commands (for example, an operating system, an application, firmware, a program, and the like) that cause a device or a computer to perform the methods according to the various embodiments, and a non-transitory computer-readable medium on which the software or the commands are recorded in a manner that is executable on the device or the computer.

What is claimed is:

1. A method of performing bidirectional inter-terminal communication by a mobile relay in a wireless communication system, the method comprising:

determining optimal values of predetermined variables for maximizing a transmission ratio for the bidirectional inter-terminal communication during a predetermined time segment using basic information of at least one of the mobile relay, a first terminal, or a second terminal;

transmitting setting information on the optimal values to at least one of the first terminal and the second terminal; and performing the bidirectional inter-terminal communication based on the optimal values, wherein the predetermined variables include at least one of a position of the mobile relay, a speed of the mobile relay, acceleration of the mobile relay, a downlink transmission power of the mobile relay, an uplink transmission power of the first terminal, an uplink transmission power of the second terminal, or a transmission resource allocation ratio for uplink and downlink, wherein a length of the predetermined time segment is defined as T, T is discretized into N time segments having the same time length, and a transmission ratio during the predetermined time segment is determined based on a transmission ratio during each of the N time segments, wherein, among the N time segments, during an n-th (n=1, 2, 3, and so forth up to N) time segment, a downlink transmission ratio $R_{Dk}[n]$ for downlink $D_k$ from the mobile relay to the k-th terminal is defined by the following equation:

$$R_{D_k}[n] = \alpha_D[n]\log_2\left(1 + \frac{p_{D_k}[n]h_k[n]}{\alpha_D[n]}\right)$$

where $\alpha_D[n]$ denotes a ratio for a downlink frequency bandwidth during the n-th time segment, $p_{D_k}[n]$ denotes a downlink transmission power from the mobile relay to the k-th terminal during the n-th time segment, and $h_k[n]$ denotes a channel gain between the first or second terminal and the mobile relay during the n-th time segment, wherein the downlink transmission ratio $R_{Dk}[n]$ is a non-convex function, and wherein a concave substitute function $\hat{R}_{D_k}^{(l)}[n]$ at l-th iteration for the downlink transmission ratio $R_{D}k[n]$ is defined as the following equation:

$$R_{D_k}^{(l)}[n] \geq \hat{R}_{D_k}^{(l)}[n] \triangleq \alpha_D^{(l)}[n]\log_2\left(1 + \frac{\hat{X}_{D_k k}^{(l)}[n]}{\alpha_D^{(l)}[n]}\right)$$

where $X_{mk}[n] \triangleq p_m[n]h_k[n]$ and m is $D_k$.

2. The method according to claim 1, wherein the determining of the optimal values includes deriving the transmission ratio as a non-convex function and approximating the non-convex function to a convex or concave function.

3. The method according to claim 2, wherein the determining of the optimal values includes initializing the predetermined variables and then performing solving by iterating the convex or concave function resulting from the approximation.

4. The method according to claim 3, wherein the determining of the optimal values includes approximating the non-convex function to the convex or concave function based on temporary optimal values acquired from the previous iteration.

5. The method according to claim 4, wherein the optimal values are determined as optimal values that are obtained in a case where the convex or concave function resulting from the approximation converges.

6. The method according to claim 1, wherein among the N time segments, during an n-th (n=1, 2, 3, and so forth up to N) time segment, an uplink transmission ratio $R_{U_k}[n]$ for uplink $U_k$ from the k-th terminal (k is first or second) to the mobile relay is defined by the following equation:

$$R_{U_k}[n] = \alpha_U[n]\log_2\left(1 + \frac{p_{U_k}[n]h_k[n]}{p_{U_{\bar{k}}}[n]h_{\bar{k}}[n] + \alpha_U[n]}\right)$$

where $\alpha_U[n]$ denotes a ratio for an uplink frequency bandwidth during the n-th time segment, $p_{U_k}[n]$ denotes an uplink transmission power from the k-th terminal to the mobile relay during the n-th time segment, $h_k[n]$ denotes a channel gain between the first or second terminal and the mobile delay during the n-th time segment, and if k=1 then $\bar{k}$=2, and if k=2 $\bar{k}$=1, and
wherein the uplink transmission ratio $R_{U_k}[n]$ is a non-convex function.

7. The method according to claim 6, wherein, by definition, $$h_k[n] = \frac{\gamma_0}{\|q[n] - w_k\|^2 + H^2}$$

where $\gamma_0$ denotes a signal-to-noise ratio (SNR) at a predetermined unit distance and $\gamma_0$ is defined as $\gamma_0 \triangleq \beta_0/(B\sigma^2)$, $\beta_0$ denotes a channel gain at the unit distance, B denotes an entire frequency bandwidth at the unit distance, $\sigma^2$ denotes a power of Gaussian noise at the unit distance, q[n] denotes a position on a two-dimensional plane, of the mobile relay during the n-th time segment, $w_k$ denotes a position on the two-dimensional plane, of the first or second terminal, and H denotes an altitude of the mobile relay.

8. The method according to claim 1, wherein, by definition, $$h_k[n] = \frac{\gamma_0}{\|q[n] - w_k\|^2 + H^2}$$

where $\gamma_0$ denotes a signal-to-noise ratio (SNR) at a predetermined unit distance, and $\gamma_0$ is defined as $\gamma_0 \triangleq \beta_0/(B\sigma^2)$, $\beta_0$ denotes a channel gain at the unit distance, B denotes an entire frequency bandwidth at the unit distance, and $\sigma^2$ denotes a power of Gaussian noise at the unit distance, q[n] denotes a position on a two-dimensional plane, of the mobile relay during the n-th time segment, $w_k$ denotes a position on the two-dimensional plane, of the first or second terminal, and H denotes an altitude of the mobile relay.

9. The method according to claim 6, wherein a concave substitute function $\hat{R}_{U_k}^{(l)}[n]$ at l-th iteration for the uplink transmission ratio $R_{U_k}[n]$ is defined as the following equation:

$$R_{U_k}^{(l)}[n] \geq \hat{R}_{U_v}^{(l)}[n] \triangleq \alpha_U^{(l)}[n]\log_2\left(1 + \frac{\hat{X}_{U_k k}^{(l)}[n] + \tilde{X}_{U_k \bar{k}}^{(l)}[n]}{\alpha_U^{(l)}[n]}\right) - $$

$$f\left(\alpha_U^{(l)}[n], \tilde{X}_{U_k k}^{(l)}[n] \mid \alpha_U^{(l-1)}[n], X_{U_k k}^{(l-1)}[n]\right)$$

where $X_{mk}[n] \triangleq p_m[n]h_k[n]$ and m is $U_k$.

10. The method according to claim 1, wherein a convex substitute function $R_{D_k}^{(l)}[n]$ at l-th iteration for the downlink transmission ratio $R_D k[n]$ is defined as the following equation:

$$R_{D_k}^{(l)}[n] \leq \alpha_D^{(l)}[n]\log_2\left(1 + \frac{\tilde{X}_{D_k k}^{(l)}[n]}{\alpha_D^{(l)}[n]}\right) \leq \hat{R}_{D_k}^{(l)}[n] \triangleq$$

$$f\left(\alpha_D^{(l)}[n], \hat{X}_{D_k k}^{(l)}[n] \mid \alpha_D^{(l-1)}[n], X_{D_k k}^{(l-1)}[n]\right)$$

where $X_{mk}[n] \triangleq p_m[n]h_k[n]$ and m is Dk.

11. A mobile relay device that performs bidirectional inter-terminal communication in a wireless communication system, the device comprising:
a transceiver;
a memory; and
a processor, wherein
the processor performs operations of
determining optimal values of predetermined variables for maximizing a transmission ratio for the bidirectional inter-terminal communication during a predetermined time segment using pieces of basic information of at least one of the relay device, a first terminal, or a second terminal, which are stored in the memory,
transmitting setting information on the optimal values to at least one of the first terminal and the second terminal through the transceiver, and
performing setting, based on the optimal values, in such a manner that the bidirectional inter-terminal communication is performed through the transceiver,
wherein the predetermined variables include at least one of a position of the mobile relay, a speed of the mobile relay, acceleration of the mobile relay, a downlink transmission power of the mobile relay, an uplink transmission power of the first terminal, an uplink transmission power of the second terminal, or a transmission resource allocation ratio for uplink and downlink,
wherein a length of the predetermined time segment is defined as T, T is discretized into N time segments having the same time length, and a transmission ratio during the predetermined time segment is determined based on a transmission ratio during each of the N time segments,
wherein, among the N time segments, during an n-th (n=1, 2, 3, and so forth up to N) time segment, a downlink transmission ratio $R_{D_k}[n]$ for downlink $D_k$ from the mobile relay to the k-th terminal is defined by the following equation:

$$R_{D_k}[n] = \alpha_D[n]\log_2\left(1 + \frac{p_{D_k}[n]h_k[n]}{\alpha_D[n]}\right)$$

where $\alpha_D[n]$ denotes a ratio for a downlink frequency bandwidth during the n-th time segment, $p_{D_k}[n]$ denotes a downlink transmission power from the mobile relay to the k-th terminal during the n-th time segment, and $h_k[n]$ denotes a channel gain between the first or second terminal and the mobile relay during the n-th time segment, wherein the downlink transmission ratio $R_{Dk}[n]$ is a non-convex function, and wherein a concave substitute function $\hat{R}_{D_k}^{(l)}[n]$ at -th iteration for the downlink transmission ratio $R_Dk[n]$ is defined as the following equation:

$$R_{D_k}^{(l)}[n] \geq \hat{R}_{D_k}^{(l)}[n] \triangleq \alpha_D^{(l)}[n]\log_2\left(1 + \frac{\hat{X}_{D_k k}^{(l)}[n]}{\alpha_D^{(l)}[n]}\right)$$

where $X_{mk}[n] \triangleq p_m[n]h_k[n]$ and m is $D_k$.

* * * * *